(12) United States Patent
Zhang et al.

(10) Patent No.: US 9,746,907 B2
(45) Date of Patent: Aug. 29, 2017

(54) SECURE WAKEUP FOR COMPUTER SYSTEMS OVER A NETWORK

(75) Inventors: Fei Zhang, Shanghai (CN); Chi-Feng Lee, Shanghai (CN); KunFu Chen, Hsinchu (TW)

(73) Assignee: QUALCOMM Incorporated, San Diego, CA (US)

( * ) Notice: Subject to any disclaimer, the term of this patent is extended or adjusted under 35 U.S.C. 154(b) by 170 days.

(21) Appl. No.: 14/349,056

(22) PCT Filed: Nov. 1, 2011

(86) PCT No.: PCT/CN2011/081627
§ 371 (c)(1),
(2), (4) Date: Jun. 17, 2014

(87) PCT Pub. No.: WO2013/063758
PCT Pub. Date: May 10, 2013

(65) Prior Publication Data
US 2014/0298066 A1 Oct. 2, 2014

(51) Int. Cl.
*G06F 9/00* (2006.01)
*G06F 1/32* (2006.01)
(Continued)

(52) U.S. Cl.
CPC .......... *G06F 1/3287* (2013.01); *G06F 1/3209* (2013.01); *H04L 12/12* (2013.01);
(Continued)

(58) Field of Classification Search
CPC .............................. G06F 1/3203; G06F 1/3287
(Continued)

(56) References Cited

U.S. PATENT DOCUMENTS

| 6,311,276 B1 | 10/2001 | Connery et al. |
| 6,493,824 B1 * | 12/2002 | Novoa .................... H04L 12/12 709/203 |

(Continued)

FOREIGN PATENT DOCUMENTS

| CN | 101953117 A | 1/2011 |
| JP | 2004199543 A | 7/2004 |

(Continued)

OTHER PUBLICATIONS

Transport Layer Security—Wikipedia.*

(Continued)

*Primary Examiner* — Aurel Prifti
(74) *Attorney, Agent, or Firm* — Paradice and Li LLP

(57) ABSTRACT

A system and method are disclosed for securely waking a computer system over a network. A registration message may be received over a network by a server from a network interface controller (NIC) in a first computer system which is in a sleep mode. The first computer system may be registered by the server by storing identification information for the first computer system may be stored in a memory. A wakeup message may be received from a second computer system over the network, the wakeup message including information identifying the first computer system and authentication information. The wakeup message may be sent to the first computer system over the network, the wakeup message indicating to the NIC to wake up the first computer system.

22 Claims, 4 Drawing Sheets

(51) Int. Cl.
*H04L 12/12* (2006.01)
*H04L 29/06* (2006.01)

(52) U.S. Cl.
CPC .............. *H04L 63/08* (2013.01); *Y02B 60/32* (2013.01); *Y02B 60/34* (2013.01)

(58) Field of Classification Search
USPC ........ 709/224, 219, 203; 713/323, 182, 300, 713/171, 168; 370/392, 311; 358/1.14; 714/11; 463/42
See application file for complete search history.

(56) References Cited

U.S. PATENT DOCUMENTS

| | | | |
|---|---|---|---|
| 6,678,728 B1 | 1/2004 | Uppunda et al. | |
| 8,219,691 B1 | 7/2012 | Karl | |
| 9,223,583 B2* | 12/2015 | Chang ................... | G06F 9/4401 |
| 2003/0202514 A1* | 10/2003 | Cromer ................ | G06F 1/3209 370/392 |
| 2005/0216736 A1* | 9/2005 | Smith ................... | H04L 63/166 713/168 |
| 2006/0248336 A1* | 11/2006 | Bruns ................... | H04L 9/3013 713/171 |
| 2007/0011446 A1 | 1/2007 | Kato et al. | |
| 2007/0067445 A1* | 3/2007 | Vugenfirer ............ | H04L 67/141 709/224 |
| 2008/0025279 A1 | 1/2008 | Young et al. | |
| 2009/0003319 A1 | 1/2009 | Sood et al. | |
| 2009/0073481 A1* | 3/2009 | Ferlitsch ............ | H04N 1/00896 358/1.14 |
| 2009/0210519 A1* | 8/2009 | Zill ........................ | H04L 12/12 709/220 |
| 2010/0165897 A1* | 7/2010 | Sood ..................... | G06F 1/3209 370/311 |
| 2011/0173490 A1* | 7/2011 | Narayanaswamy | H04L 63/1408 714/4.11 |
| 2011/0213992 A1* | 9/2011 | Satsangi ............... | G06F 1/3209 713/300 |
| 2011/0269546 A1* | 11/2011 | Gill ......................... | A63F 13/31 463/42 |
| 2011/0283110 A1* | 11/2011 | Dapkus ................. | G06F 21/577 713/182 |
| 2011/0302278 A1* | 12/2011 | Shim ...................... | H04L 12/12 709/219 |
| 2011/0302436 A1* | 12/2011 | Clark ................. | H04W 52/0235 713/323 |
| 2016/0192403 A1* | 6/2016 | Gupta ................. | H04W 76/002 455/411 |

FOREIGN PATENT DOCUMENTS

| | | |
|---|---|---|
| JP | 2006344021 A | 12/2006 |
| JP | 2007036624 A | 2/2007 |
| KR | 20060128618 A | 12/2006 |
| WO | WO-2009104828 A1 | 8/2009 |
| WO | WO-2009105323 A1 | 8/2009 |

OTHER PUBLICATIONS

Web Service Security Username token Prifile Jun. 28, 2005.*
RSA SecureID—Wikipedia.*
International Search Report and Written Opinion—PCT/CN2011/081627, International Search Authority—European Patent Office, Sep. 8, 2012.
Supplementary European Search Report—EP11875075—Search Authority—The Hague—May 28, 2015.

* cited by examiner

SECURE WAKEUP FOR COMPUTER SYSTEMS OVER A NETWORK

BACKGROUND

Field of the Disclosure

The present invention relates generally to computer systems, and more particularly to a system and method for securely waking a computer system over a network.

Description of the Related Art

Computer systems are ubiquitous in today's society. A common feature of computer systems is an ability to enter a "sleep" (or "standby" or "low power") state to conserve power. Typically, "waking" a computer system in such a state is simple if one is in close proximity to the computer system: pressing a power button, a "wake-up" button, or triggering another local input device (such as a keyboard or a mouse) are typical means for locally waking a computer system.

However, with the increasing mobility and connectedness of computer systems, remote access to a computer system has also become a desirable capability. Network connections, e.g., via network interface controllers, can enable computer systems to communicate over local and/or wide area networks. However, if a computer is in a sleeping state, the computer system may be inaccessible to other computer systems via such a network.

Solutions for waking a computer system over a network have been proposed, but such solutions generally have significant associated problems. For example, if a sleeping computer device undergoes network address translation (NAT) (e.g., if the computer device is behind a router), this may interfere with transmission of a wake command. In some cases, such a sleeping device may be unable to receive a wake command unless proper de-militarized zone (DMZ)/port forwarding and static address resolution protocol (ARP) are set at the NAT router. This is complex and may not be desirable (e.g., for security reasons), or, in business situations, permitted by company policy.

Additionally; existing solutions provide no security. Using existing techniques, anyone could wake up a sleeping computing device if the IP address or MAC address is known. As a result, the sleeping computer could be accidentally woken as a result of receiving a packet that coincidentally matches a wake command, or intentionally woken for malicious purposes, e.g., by a hacker.

Accordingly, improvements in the field would be desirable.

SUMMARY OF THE DISCLOSURE

Embodiments of the disclosure are presented in order to provide a secure system and method for securely waking a sleeping computer system over a network. Some embodiments of the disclosure are directed at a method for a server to facilitate secure wakeup of a computer system over a network (e.g., a wide-area network such as the internet), a server configured to implement the method, and program instructions comprised on a memory medium that are executable by a computer system (e.g., a server) to implement the method. Embodiments of the disclosure are also directed to a method for a network interface controller (NIC) to enable secure wakeup of a computer system over a network, and a NIC configured for use in the computer system and configured to implement the method.

One advantage of the systems and methods disclosed herein is the ability to wake up a computer system when the computer system is subject to network address translation (NAT). For example, many routers, which are commonly used to provide a local area network and provide connectivity of that local area network to a wide area network, provide NAT to the computing devices in the local area network. Such computing devices may have trouble receiving wake commands unless proper de-militarized zone (DMZ)/port forwarding and static address resolution protocol (ARP) are set at the router providing NAT. This is a complex process and in some situations (e.g., business settings), may not be permitted by company IT policy.

According to some embodiments, the systems and methods disclosed herein may advantageously include the sleeping client initiating registration with a wakeup facilitating server. By initiating contact with the server, and periodically renewing the contact, e.g., by periodically sending new registration messages, a live connection may be maintained between the sleeping computer system and the server. This may allow the server to send wakeup messages to the sleeping computer system without needing to navigate the NAT.

Another advantage of the systems and methods disclosed herein is the provision of security. Without security, it may be possible for anyone to wake up a sleeping computer system given basic information (e.g., the IP address). This could occur maliciously, such as by a hacker, or because packets sent to the sleeping client accidentally match specified wake up patterns (such as Wake Over Lan (WOL) patterns).

According to some embodiments, the systems and methods disclosed herein may advantageously include authenticating wakeup messages by one or both of a wakeup server and the sleeping computer system itself. Additionally, in some embodiments both wakeup messages and other messages provided in the systems and methods may be encrypted, for an additional layer of security.

Embodiments of the methods for a server and a NIC configured for use in a computer system to facilitate secure wakeup of the computer system over a network may be performed as follows.

A registration message may be received from a first computer system over the network. The first computer system may include a network interface controller (NIC), from which the registration message may be received while the first computer system is in a sleep mode. The registration message may include user-selected human-readable identification information for the first computer system. The first computer system may be registered, which may include storing identification information (which may include the user-selected human-readable identification information) for the first computer system in a memory. In some embodiments, the registration message may also include a nonce and an encryption algorithm, which may also be stored in the memory.

In some embodiments, a query request may be received from a second computer system over the network. The query request may include the identification information for the first computer system.

In those embodiments in which a query request is received from the second computer system, a query reply may be sent to the second computer system over the network. The query reply may include the identification information for the first computer system, the nonce, and the encryption algorithm, and/or other information, depending on the embodiment.

A wakeup message may be received from the second computer system over the network. The wakeup message may include information identifying the first computer system. In some embodiments, the information identifying the first computer system may include the user-selected human-readable identification information for the first computer system, and/or other identification information which was stored in memory during registration of the first computer system. The wakeup message may also include authentication information. In some embodiments, the authentication information may include the nonce, which may be encrypted according to the encryption algorithm. In some embodiments, additionally or alternatively, a password or other pre-shared key (e.g., which is known to the first computer system and the second computer system) may be used as part of encrypting the nonce and/or as another type of authentication information.

The wakeup message may be sent to the first computer system. In some embodiments, the wakeup message may be authenticated by the server based on the authentication information included in the wakeup message. In such embodiments, sending the wakeup message to the first computer system may be based on successfully authenticating the authentication information in the wakeup message. Alternatively, the server may simply send the wakeup message to the first computer system and allow the NIC in the first computer system to authenticate the wakeup message.

The NIC may receive the wakeup message. The wakeup message may be authenticated by the NIC based on the authentication information. It should be noted that in some embodiments, the NIC may be configured to authenticate the wakeup message regardless of whether the server also performs authentication on the wakeup message, e.g., for extra security. If the wakeup message is successfully authenticated, the NIC may wakeup the first computer system.

In some embodiments, based on the NIC sending the registration message to the server and the server receiving the registration message from the NIC, a connection may be maintained between the NIC and the server for a pre-determined period of time after the registration message is received. As noted above, in some embodiments, this actively maintained connection may advantageously allow the server to send wakeup messages to the NIC regardless of any NAT between the server and the first computer system. Thus, according to some embodiments, registering the first computer system, receiving the query request and sending the query reply, and receiving and sending the wakeup message may be performed while the connection with the NIC is maintained. In other words, a wakeup message received by the server from a computer system may only be forwarded to the first computer system if the connection with the first computer system is still active.

The pre-determined period of time for which the connection is maintained may expire if no further messages are exchanged between the server and the NIC prior to the end of the pre-determined period of time. Accordingly, in some embodiments, a new registration message may periodically be received from the NIC (e.g., before expiration of the connection with the NIC, in order to maintain a continuous connection). Based on receiving each new registration message, the connection between the NIC and the server may be extended. For example, depending on the embodiment, a new pre-determined period of time may be established, or an additional pre-determined period of time may be added to the remaining pre-determined period of time.

BRIEF DESCRIPTION OF THE DRAWINGS

A better understanding of the present invention can be obtained when the following Detailed Description of the Embodiments is read in conjunction with the following drawings, in which.

Figure 2:
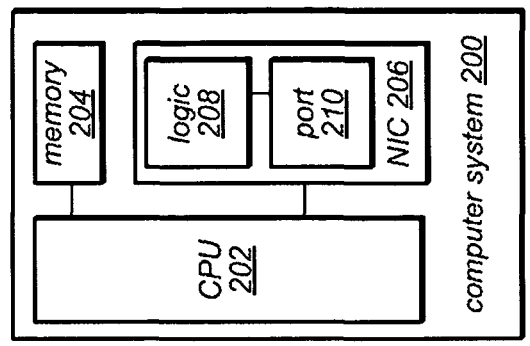
FIG. 2 is a block diagram illustrating possible components of a computer system according to one embodiment.

While the invention is susceptible to various modifications and alternative forms, specific embodiments thereof are shown by way of example in the drawings and are herein described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF EMBODIMENTS OF THE DISCLOSURE

Terms

The following is a glossary of terms used in the present application:

Memory Medium—Any of various types of memory devices or storage devices. The terms "memory" and "memory medium" are intended to include an installation medium, e.g., a CD-ROM, floppy disks, or tape device; a computer system memory or random access memory such as DRAM, DDR RAM, SRAM, EDO RAM, Rambus RAM, etc.; or a non-volatile memory such as flash memory, hardware registers, a magnetic media (e.g., a hard drive), or optical storage. The memory medium may comprise other types of memory as well, or combinations thereof. The term "memory medium" may include two or more memory mediums.

Computer System—Any of various types of mobile or stationary computing or processing systems, including a personal computer system (PC), mainframe computer system, workstation, network appliance, Internet appliance, mobile phone, smart phone, laptop, notebook, netbook, or tablet computer system, personal digital assistant (PDA), multimedia device, or other device or combinations of devices. In general, the term "computer system" can be broadly defined to encompass any device (or combination of devices) having at least one processor that executes instructions from a memory medium.

With the expanding influence of the internet and the explosion in numbers of both stationary and mobile computing devices, remotely accessing one computer system from another computer system has become a commonplace activity. However, typically in order to access a computer system remotely, that computer system has to be powered on. Thus, if a user who is travelling (or even at their office) wants to access their personal computer at home from their laptop computer, it would seem that the personal computer must be left on for the entire time the user is away. However, leaving the personal computer on for such a long time may be wasteful of energy and increase wear on the personal computer. A variety of other such problematic situations could as easily be imagined.

Nearly every computer system includes the capability to enter a "sleep" (or "standby" or "low power") state to conserve power. "Waking" a computer system in such a state (i.e., returning the computer system to a fully-on state) may be simple if the user is in close proximity to the computer system: pressing a power button, a "wake-up" button, or triggering another local input device (such as a keyboard or a mouse) are typical means for locally waking a computer system.

However, given the increasingly common possibility that a user may want to access a computer remotely (but possibly infrequently), remotely waking a sleeping computer system should also be enabled. This would allow a user to put a computer system to sleep, thereby saving power and wear on the computer system, while still retaining the ability to later access the computer system remotely, e.g., over the internet.

It should be noted, though, that because of the same aforementioned expanding influence of the internet, providing a means for waking a computer system over a network (e.g., a wide area network such as the internet) without security could leave the computer system open to attack or accidental waking. Security should then also be a primary consideration in designing a system and method for remotely waking a sleeping computer system.

FIG. 1

Figure 1:
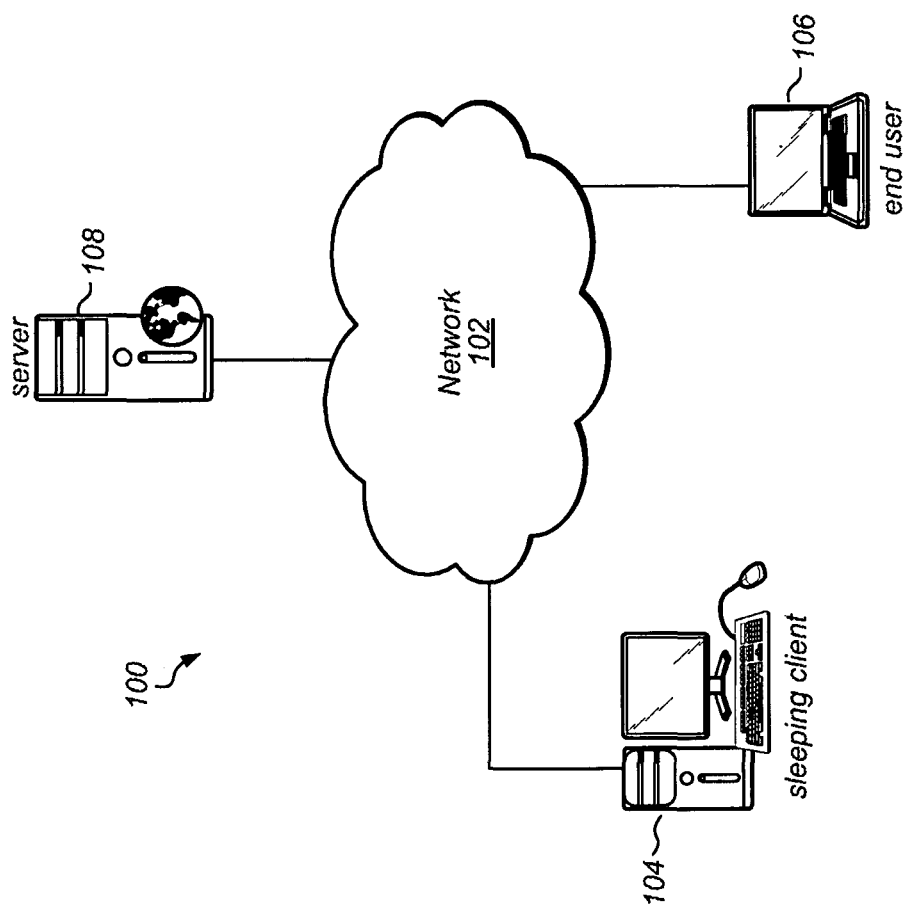
FIG. 1 illustrates an exemplary system including several networked computer systems, according to one embodiment.

Accordingly, embodiments of this disclosure relate to securely waking a sleeping computer system over a network. FIG. 1 illustrates an exemplary system 100 including a variety of networked devices, some or all of which may be used to implement embodiments of this disclosure.

The system 100 may include a network 102 which provides communicative coupling between the various devices coupled to network 102. Network 102 may be a wide area network such as the internet, in some embodiments. Network 102 may accordingly include and/or be communicatively coupled to a plurality of other networks, such as one or more local area networks. Network 102 (including any "sub-networks") may include wired and/or wireless networks according to any of a variety of standards and versions (e.g., Ethernet, powerline communication systems, fiber optic networks, IEEE 102.11 (WiFi), IEEE 102.16 (WiMAX), etc) and including any of a variety of communicative media, as will be recognized by those of skill in the art.

Various computer systems may be coupled to network 102, including computer systems 104, 106, and 108. Computer systems 104, 106, and 108 may be coupled to network 102 directly or indirectly, e.g., via one or more intermediate networks, which like network 102, may also include wired and/or wireless networks according to any of a variety of standards and versions. Other computer systems and/or devices may also be coupled to network 102 in some embodiments.

According to one set of embodiments, computer system 104 may be a sleeping client computer system configured to be securely woken up over network 102 by end-user computer system 106 via server computer system 108. For example, computer systems 104, 106, and 108 may be configured to implement aspects of the method described below with respect to FIG. 3.

As will be understood by those skilled in the art, each of computer systems 104, 106, and 108 may be implemented in a variety of ways. FIG. 2 illustrates basic components which may be used to implement one or more of computer systems 104, 106, and 108 according to one set of embodiments. Other system configurations for computer system 104, 106, and 108 are also possible.

FIG. 2

FIG. 2 is a simplified block diagram illustrating various components of a computer system 200. According to various embodiments, computer system 200 may be used to implement one or more of computer systems 104, 106 and/or 108 shown in FIG. 1; thus, one or more elements of computer system 200 may be configured to implement one or more aspects of the method described below with respect to FIG. 3.

Computer system 200 may include a processor 202, which may be coupled to a memory medium 204. Computer system 200 may further include a network interface controller (NIC) 206 coupled to processor 202. NIC 206 may enable the computer system 200 to communicate over a network. For example, as shown, NIC 206 may include a port 210 and logic 208 configured to control port 210 independently and/or in conjunction with processor 202. Port 210 may be wired (e.g., an Ethernet, powerline, telephone line, coaxial cable, or other wired connection) or wireless (e.g., an IEEE 102.11 (WiFi), IEEE 102.16 (WiMAX), Bluetooth, or other wireless connection). In some embodiments, NIC may include multiple ports and/or support network communications via multiple communicative media (e.g., a plurality of wired and/or wireless connections).

The control logic 208 may be implemented using any of various types of logic, such as analog logic, digital logic, a processor (such as a CPU, DSP, microcontroller, etc.), an ASIC (application specific integrated circuit), an FPGA (field programmable gate array), or any combination of the above. In one embodiment, control logic 208 may be implemented partially or entirely as a hardware-based state machine. For example, in an embodiment in which computer system 200 is used to implement sleeping client computer system 104 of FIG. 1, NIC 206 may include a finite state machine configured for sending registration messages to and receiving wakeup messages from server computer system 108, and for authenticating those wakeup messages and waking up the sleeping client computer system 104.

In some embodiments, processor 202 may be a general purpose processor. For example, processor 202 may be configured to execute any of a variety of program instructions (e.g., software) stored on memory medium 204. Alternatively, or in addition, computer system 200 may include one or more dedicated (e.g., special purpose) processing units, such as microcontrollers, digital signal processors, and/or other embedded systems. In one set of embodiments, e.g., in which computer system 200 is used to implement server computer system 208 of FIG. 1, memory medium 204 may include program instructions for facilitating secure wake-up of sleeping client computer system 104 over network 102, e.g., according to embodiments of the method described below with respect to FIG. 3. It should also be noted that processor 202 may include a single processor or a plurality of processors (e.g., in order to increase the computing capability of computer system 200), as desired.

Computer system 200 may be any of a variety of types of device, and may implement any of a variety of functionalities, according to various embodiments. For example, computer system 200 may be a mobile phone or smart phone, a tablet, netbook, laptop, desktop, server, or other computer system, a portable media player, a personal digital assistant, or generally any other type of computing device which may be used to communicate over a network in a wired or wireless manner.

As briefly noted above, computer system 200 may be implemented in a variety of ways according to various embodiments. Thus, for example, exemplary computer system 200 is described above as being representative of any of computer systems 104, 106, and 108 shown in FIG. 1; those skilled in the art will recognize that this should not be understood to imply that each of computer systems 104, 106, and 108 are necessarily identical. It is possible and, in practice, may be typical for computer systems 104, 106, and 108 to include different components and differing configurations. For example, client computer systems/end user devices may typically have significant differences in capability and functionality from server computer systems.

Furthermore, as will be understood by those of skill in the art in light of this disclosure, depending on the implementation, computer system 200 may also include any of a variety of other components as desired (e.g., display, user input device(s), speaker(s), additional input/output capability, etc), for example, for implementing other functionality. Such components are not shown in order to avoid obscuring details of the disclosure.

FIG. 3

Figure 3:
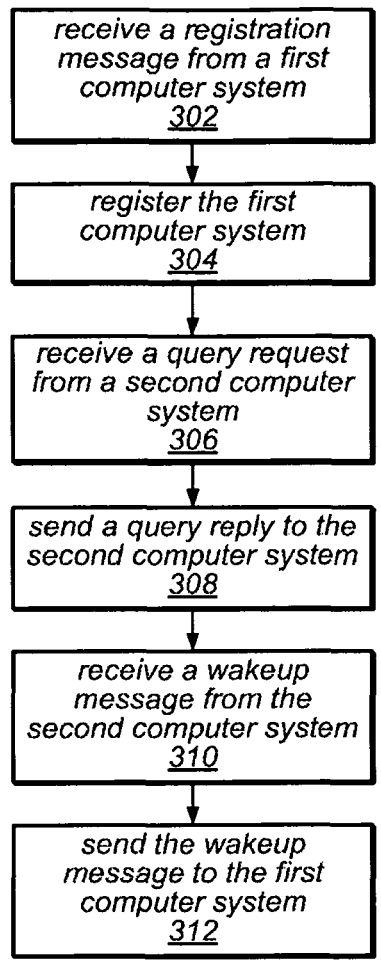
FIG. 3 is a flowchart diagram illustrating embodiments of a method for securely waking a computer system over a network.

FIG. 3 is a flowchart diagram illustrating embodiments of a method for securely waking a computer system over a network. Embodiments of the method may be implemented by a server computer system, a sleeping client computer system (referred to herein as the first computer system), and/or an end user computer system (referred to herein as the second computer system). For example, aspects of the method of FIG. 3 may typically be implemented by the devices of FIGS. 1-2 of this disclosure.

Thus, the first computer system may include a network interface controller (NIC) including a port and logic configured to register with the server and receive wakeup messages over the server, to authenticate those wakeup messages, and to wake the first computer system, all while the first computer system is in a sleep mode.

Additionally, the server computer system may include a processor and a memory medium including program instructions executable by the processor to facilitate waking of the first computer system by the second computer system over the network.

While the steps described below with respect to FIG. 3 are shown in a certain order, it should be noted that, according to various embodiments, one or more of the steps may be omitted, repeated, or performed in a different order than shown. One or more additional steps may also or alternatively be added, as desired. The method may be performed as follows.

At step 302, a registration message may be received by the server. The registration message may be sent by the NIC of the first computer system over the network. The network may be a wide-area network, such as the internet. The registration message may be sent by the NIC while the first computer system is sleeping. For example, the NIC may continue to draw a small amount of power, in order to preserve the limited functionality needed to send the registration message and perform other functions related to maintaining the capability to receive and authenticate a wakeup message and wake the computer system, even while the computer system is otherwise in a sleep mode. Depending on the embodiment, this may be facilitated by implementing the logic in the NIC responsible for maintaining the secure wakeup capability as a simple hardware logic system, such as a state machine, as such a system may have a lower power requirement than other systems. However, various other embodiments, including those in which the "wakeup" logic is implemented as a processor (e.g., an embedded processor) executing program instructions stored on a memory medium, are also possible.

The registration message may include information identifying the first computer system. For example, in some embodiments, the registration message may include the hostname of the first computer, and/or netbios shared folders. In some embodiments an IP address of the first computer may (e.g., implicitly or explicitly) be included in the registration message. According to some embodiments, either or both of IPv4 and IPv6 may be supported. Additionally (or alternatively), the registration message may include user-selected human-readable identification information for the first computer system. For example, the first computer system may be configured by a user (e.g., prior to entering the sleep mode) to have an identification name and/or number selected by that user, such as "home123" or "bobsworkstation".

In some embodiments, the registration message may also include information that may be used for authentication purposes. For example, in one embodiment, the registration message may include a nonce (e.g., a random or pseudo-random number, such as a random octet) and an encryption method which may be used to encrypt the nonce (and/or other information). Alternatively, or in addition, a password or other authentication information (e.g., depending on the implementation) may be included in the registration message. In some embodiments, the authentication information (e.g., the nonce and/or the encryption method) may be generated by the first computer system and/or selected by a user.

At step 304, the first computer may be registered by the server. Registering the first computer system may include storing some or all of the information included in the registration message from the first computer system in a memory. For example, any or all of the hostname, netbios shared folders, IP address, user-selected human-readable ID, and/or authentication information for the first computer system may be stored in the memory.

In some embodiments, the NIC of the first computer system and the server may maintain an active connection for a pre-determined period of time after the first computer system sends the registration message to the server. For example, the server may initiate a timeout timer of a pre-determined length upon receiving the registration message. After the pre-determined period of time (which may be 5, 15, 30, or 60 seconds, or any other length of time, as desired), the connection may expire. If the connection does timeout, the server may be unable to send messages (such as a wakeup message) to the NIC. Alternatively, the server may be able to send messages to the NIC, but some or all of the registration information (e.g., the nonce and/or the encryption algorithm) may no longer be valid.

Accordingly, it may be desirable for the first computer system to periodically send a new registration message to the server, in order to maintain the active connection with the server and thereby maintain the capability to receive a wakeup message over the network, as long as the first computer system remains in a sleep mode. Thus, in some embodiments, the server may periodically receive a new registration message from the NIC. Each new registration message may include similar types of information as were included in the original registration message. In some embodiments, each new registration message may be identical to the previous registration messages. Alternatively, some information may be updated or changed in some or all new registration messages; for example, in some embodiments, the nonce may be updated periodically for security reasons. The new registration message(s) may be sent with a periodicity such that each new registration message is received by the server before expiration of the connection with the NIC. As a result of receiving each new registration message, the server may extend the connection with the NIC for an additional pre-determined period of time, or simply renew the time-out timer, such that the connection between the NIC of the first computer system and the server may remain continuously active as long as the first computer system is in the sleep mode.

At step 306, a query request may be received by the server. The query request may be sent by the second computer system. In some embodiments, the query request may be initiated by a user (e.g., a user of both the first computer system and the second computer system) of the second computer system, as a first step towards waking the first computer system over the network. The query request may include identification information for the first computer system. For example, the query request may include the host name, IP address, and/or the user-selected human-readable ID of the first computer. In one embodiment, the query request may include just the user-selected human-readable ID of the first computer. This may be preferable in some embodiments, as it may allow a user to make the query request using just the (presumably easier to remember) ID which they (or another human user) may have selected.

In other embodiments, additional information may also or alternatively be included in the query request. For example, in some embodiments, the query request may include authentication information (such as a password, symmetric or asymmetric key encrypted information, and/or other authentication information, depending on the implementation), which the server may authenticate prior to responding to the query request.

At step 308, a query reply may be sent to the second computer system by the server. The query reply may include information needed by the second computer system in order to generate and send a wakeup message to the first computer system. For example, the query reply may include some or all of the information received by the server from the first computer system in the registration message. As one example, in the above described embodiment in which the registration message includes a nonce and an encryption algorithm, the query reply may include the user-selected human-readable ID of the first computer, the nonce; and the encryption algorithm. In some embodiments, the query reply may also or alternatively include the hostname and/or netbios shared folders of the first computer system. The query reply may be received by the second computer system.

At step 310, a wakeup message may be received by the server. The wakeup message may be generated and sent by the second computer system. The wakeup message may include identification information for the first computer system and authentication information.

In some embodiments, the identification information included in the wakeup message may again include the user-selected human-readable ID of the first computer. Additionally, or alternatively, one or more other forms of identification information for the first computer system may be included in the wakeup message. For example, in some embodiments one or more of the hostname, netbios shared folders, and/or IP address of the first computer system may be included in the wakeup message.

In some embodiments, the second computer system may use information received in the query reply in order to generate the authentication information to be included in the wakeup message. For example, if the query reply includes the aforementioned nonce and encryption algorithm, the second computer system may use the encryption algorithm to encrypt the nonce, and include the encrypted nonce in the wakeup message. Alternatively, or additionally, the wakeup message may include a pre-shared key. In other words, the wakeup message may include information which is known to the first computer system and to (e.g., a user of) the second computer system, which the first computer system may use to authenticate the wakeup message. An example which may be used in some embodiments is a password, e.g., a user-selected sequence of alphanumeric characters. Other embodiments may include other types of pre-shared keys.

It should be noted that in some embodiments, steps 306 and 308 (query request and query reply) may be omitted. For example, in some embodiments, a user at the second computer system may already have all of the necessary information to generate and send a wakeup message to the first computer system (i.e., via the server). For example, according to some embodiments, a user of the second computer may be able to provide the user-selected human-readable ID of the first computer and a user-selected pre-shared password as inputs, based on which the second computer system may generate and send the wakeup message to the server, thereby bypassing the query request and query reply steps.

At step 312, the wakeup message may be sent to the first computer system by the server. In some embodiments, the wakeup message may be sent by the server to the first computer system as received from the second computer system. Alternatively, the server may modify or authenticate the wakeup message before sending the wakeup message to the first computer system.

The first computer system may receive the wakeup message from the server computer system. The wakeup message may specifically be received by the NIC of the first computer system (e.g., since the computer system may generally be in a sleep mode). The NIC may authenticate the wakeup message (e.g., in addition to or instead of the server), and, if the wakeup message is successfully authenticated, the NIC may wake up the first computer system. After waking, the first computer system may be in a fully-on state, and may be capable of interacting with other computer systems (such as the second computer system) over the network.

The manner in which the NIC is configured to authenticate the wakeup message may vary depending on the embodiment. For example, if the wakeup message includes the nonce encrypted according to the encryption algorithm, authenticating the wakeup message may include decrypting the encrypted nonce included in the wakeup message and comparing it to the original nonce, or comparing the received encrypted nonce to a pre-configured encrypted nonce (e.g., generated by the first computer based on the encryption algorithm). If the comparison indicates that they are the same, the wakeup message may be authenticated and the NIC may wake up the first computer system. The nonce included in the wakeup message may be encrypted (e.g., using the encryption algorithm) according to the key provided by the second computer system. The key can be a password, a key from pre-shared x.509 certificate, or some other kind of pre-shared key. Thus, in some embodiments, the pre-shared key may be included by using it to encrypt the nonce. In other words, in some embodiments, the pre-shared key may not transferred in plain text, e.g., for security reasons; however, in other embodiments the password may be so transferred, if desired.

Although specific examples of authentication systems are given above (e.g., passwords, pre-shared keys), it should be noted that any of a variety of other authentication systems may also or alternatively be implemented in some embodiments. For example, any symmetric or asymmetric cryptosystem can be implemented. Furthermore, an authentication server, such as Kerberos, RADIUS, Domain Authentication, or another authentication server, may be used if desired.

Furthermore, embodiments are also considered in which some or all of the above-described messages (e.g., registration messages, query requests, query replies, wakeup messages) are encrypted (e.g., using a symmetric, asymmetric, or other encryption system), in order to prevent unauthorized users from gaining access to information which would allow them to wake up the first computer system.

Embodiments of the method may include several advantages over existing methods for remotely waking a sleeping computer system. For example, most existing methods relate to methods for waking a sleeping computer over a local area network. Examples include wake over LAN (WOL) patterns (in which a specified offset and matching pattern indicate a wake command), magic WOL (in which a packet contains 16 continuous MAC addresses of a sleeping computer system), and link change (in which media, such as a network cable, is connected). These methods are not intended to be performed through NAT. Even those that could be used through NAT would require extensive configuration, which may have the undesirable side effect of decreasing the security of the target computer system. Furthermore, none of these methods include security. Thus, embodiments of the method of FIG. 3, which are both capable of being performed through NAT without any special configuration and include security/authentication features, represent a significant improvement over the existing solutions.

FIG. 4

Figure 4:
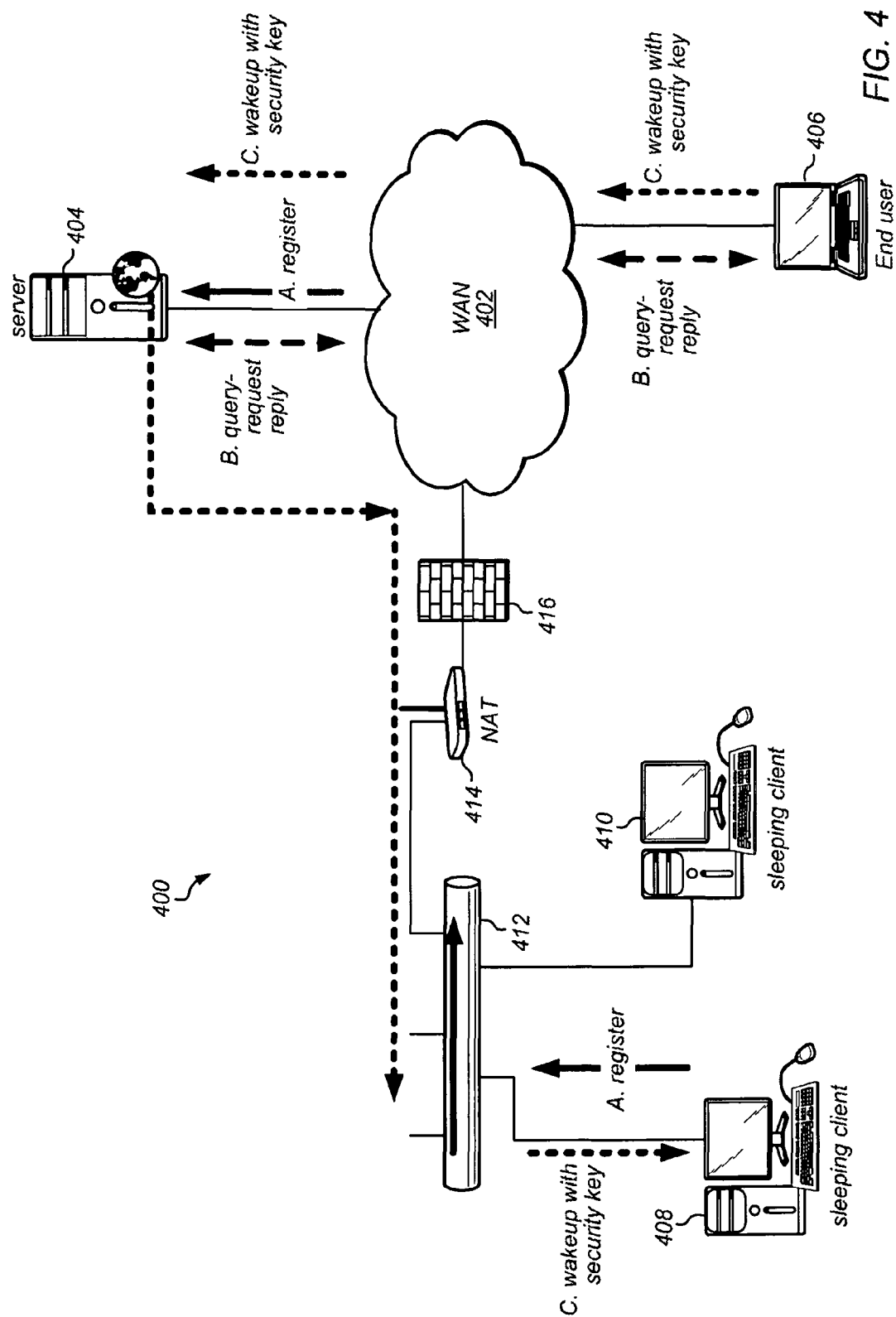
FIG. 4 illustrates an exemplary system including a variety of networked devices and including an exemplary message flow between the devices according to one embodiment.

FIG. 4 is an illustration of an exemplary system 400 in which the method described above with respect to FIG. 3 may be implemented according to one embodiment. The system 400 of FIG. 4 is shown and described herein in order to provide a more specific example of a system and manner in which embodiments of the disclosure may be implemented. However, as one of skill in the art will appreciate, numerous variations on and alternatives to the specific details of the system of FIG. 4 are possible, and neither FIG. 4 nor the description thereof should be considered limiting to the disclosure as a whole.

As shown, the system 400 may include a network 402, which may be a wide-area network (WAN), such as the internet. Server computer system 404 may be coupled to WAN 402 at a first location. End user computer system 406 may be coupled to WAN 402 at a second location. Sleeping client computer systems 408 and 410 may be coupled to WAN 402 via a local area network (LAN) 412. LAN 412 may be provided (e.g., wirelessly) by router 414, which may provide network address translation (NAT) on the LAN 412 side of a firewall 416.

Sleeping client 408 may register with server 404 via LAN 412 and WAN 402. In the embodiment of FIG. 4, registering may be performed by a NIC (not shown) in sleeping client 408, and may include sending a message including an encoded hostname and netbios shared folders of the sleeping client 408, an encoded ID of the sleeping client 408 (which may be user-selected, e.g., prior to the sleeping client 408 entering the sleep mode), a nonce (which may be an octet which is randomly generated by the sleeping client 408), and an encrypt algorithm. The server may store all of this information.

After sleeping client 408 has registered with server 404, end user 406 may generate and send a query request to the server 404. The query request may simply include the encoded ID of the sleeping client 408.

Based on receiving the query request from end user 406, the server 404 may send a query reply to end user 406. The query reply may include the encoded ID of the sleeping client 408, and the nonce and the encrypt algorithm from the register message.

Having received the query reply from the server 404, the end user 406 may generate a wakeup message with a security key. The wakeup message may include the encoded ID of the sleeping client 408, and the nonce encrypted according to a key input of the end user. In other words, the nonce may be encrypted using the encrypt algorithm included in the register message according to the key input (e.g., a password or other pre-shared key) by the end user 406.

The end user 406 may send the wakeup message to the server 404, which may forward the wakeup message to the sleeping client 408. The NIC in the sleeping client 408 may receive the wakeup message, and check the encrypted nonce. If it is encrypted using the correct key, the NIC may wake up the sleeping client 408.

FIG. 5

Figure 5:
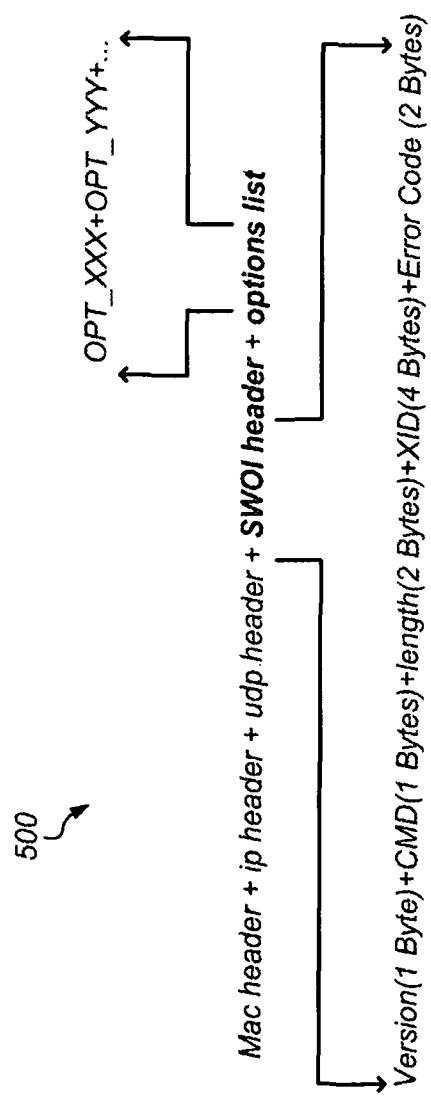
FIG. 5 is a diagram illustrating a typical message format according to one embodiment.

FIG. 5 illustrates an exemplary message format which may be used as part of a system and method for securely waking a computer system over a network according to one embodiment. The message format illustrated may take the form of a user datagram protocol (UDP) packet.

As shown, the message may include a media access control (MAC) header, an internet protocol (IP) header, and a UDP header. Following these headers, which may be implemented as known in the art according to UDP protocol, a "secure wake over internet" ("SWOI") header may be included. The SWOI header may include version information, a command (CMD) indicator, a length field, an XID, and an Error Code, according to one embodiment. The version field may indicate a version of the message format. The CMD field may indicate a type of SWOT message, such as a registration message, a query request, a query reply, or a wakeup message. The length field may indicate a length (e.g., in bytes) of the options list to follow. Error correction coding information and/or other information may also be included in some embodiments. In some embodiments, a portion of the message format may be reserved for changes to future changes to the message format. While specific lengths in bytes are shown for the SWOI header fields (e.g., 1 byte for version, 1 byte for CMD, 2 bytes for length, 4 bytes for XID, and 2 bytes for Error Code), these are exemplary only and other lengths are also considered.

The options list may include the substance of a message. For example, possible options could include an encoded host name, a user-selected ID, a nonce, an encrypt algorithm, or any of a variety of other options, potentially depending on the message type. According to one embodiment, each option may include three fields: option type (e.g., identifying a type of the option), option length (e.g., identifying a length of the option data field), and the option data itself. According to one embodiment, the option type field may be 1 byte long, the option length field may be 2 bytes long, and the option data field may be as long as is indicated by the option length field; other field lengths are also possible. In some embodiments, a single packet may include multiple options in the option list. In some other embodiments, each packet may only include a single option.

While the message format shown in FIG. 5 is one possible UDP based message format, those skilled in the art will recognize that other UDP based message formats, or any of a variety of other types of packets (e.g., using other protocols, such as TCP) may be used, as desired. Thus, while the message format shown in FIG. 5 represents one possible means of implementing the messages described herein, neither FIG. 5 nor this description thereof should be considered limiting to the disclosure as a whole.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A computer-implemented method for a server to facilitate secure wakeup of a computer system over a network, the method comprising:
   receiving, by the server, a registration message from a network interface controller (NIC) of a first computer system over the network via a connection with the NIC, while the first computer system is in a sleep mode, wherein the registration message includes identification information for the first computer system, a nonce, and an encryption algorithm;
   maintaining the connection with the NIC for a period of time after receiving the registration message from the NIC, wherein the period of time is based on when the registration message is received from the NIC;
   registering, by the server, the first computer system by storing the identification information, the nonce, and the encryption algorithm in a memory;
   receiving, by the server, a wakeup message from a second computer system to wake the first computer system from the sleep mode;
   authenticating, by the server, the wakeup message using the stored nonce and the stored encryption algorithm; and
   sending, by the server, the authenticated wakeup message to the NIC of the first computer system.

2. The computer-implemented method of claim 1, wherein registering the first computer system, receiving the wakeup message, and sending the wakeup message are performed while the connection with the NIC is maintained.

3. The computer-implemented method of claim 1, further comprising:
   periodically receiving a new registration message from the NIC, wherein the new registration message is received before expiration of the connection with the NIC; and
   maintaining the connection with the NIC for an additional period of time after receiving each respective new registration message, wherein the additional period of time is based on when the respective new registration message is received from the NIC.

4. The computer-implemented method of claim 1, wherein:
   the identification information for the first computer system comprises user-selected human-readable identification information; and
   the wakeup message includes the user-selected human-readable identification information.

5. The computer-implemented method of claim 1, wherein the wakeup message includes a pre-shared key that is known to the first computer system and the second computer system.

6. The computer-implemented method of claim 1, wherein the network is a wide-area-network.

7. The computer-implemented method of claim 1, further comprising:
   receiving a query request, from the second computer system, that includes the identification information for the first computer system; and
   sending a query reply, to the second computer system, that includes the identification information for the first computer system, the nonce, and the encryption algorithm.

8. The computer-implemented method of claim 1, wherein:
   the wakeup message includes authentication information; and
   the authentication information includes the nonce encrypted according to the encryption algorithm.

9. A non-transitory computer-readable memory medium comprising program instructions for a server to facilitate secure wakeup of a first computer system over a network, wherein execution of the program instructions cause the server to:
   receive a registration message from a network interface controller (NIC) of the first computer system over the network via a connection with the NIC, while the first computer system is in a sleep mode, wherein the registration message includes identification information for the first computer system, a nonce, and an encryption algorithm;
   maintain the connection with the NIC for a period of time after receiving the registration message from the NIC, wherein the period of time is based on when the registration message is received from the NIC;
   register the first computer system by storing the identification information for the first computer system, the nonce, and the encryption algorithm in a memory;
   receive a wakeup message from a second computer system to wake the first computer system from the sleep mode;
   authenticate the wakeup message using the stored nonce and the stored encryption algorithm; and
   send the authenticated wakeup message to the NIC of first computer system.

10. The non-transitory computer-readable memory medium of claim 9, wherein
    the program instructions are executable to register the first computer system, receive the wakeup message, and send the wakeup message within the period of time.

11. The non-transitory computer-readable memory medium of claim 9, wherein execution of the program instructions further cause the server to:
    periodically receive a new registration message from the NIC, wherein the new registration message is received before expiration of the connection with the NIC; and
    maintain the connection with the NIC for an additional period of time after receiving each respective new registration message, wherein the additional period of time is based on when the respective new registration message is received.

12. The non-transitory computer-readable memory medium of claim 9, wherein:

the identification information for the first computer system comprises user-selected human-readable identification information; and the wakeup message includes the user-selected human-readable identification information.

13. The non-transitory computer-readable memory medium of claim 9, wherein the wakeup message includes a pre-shared key that is known to the first computer system and the second computer system.

14. The non-transitory computer-readable memory medium of claim 9, wherein the network is a wide-area-network.

15. The computer-readable memory medium of claim 9, wherein execution of the program instructions further cause the server to:

receive a query request, from the second computer system, that includes the identification information for the first computer system; and send a query reply, to the second computer system, that includes the identification information for the first computer system, the nonce, and the encryption algorithm.

16. The non-transitory computer-readable memory medium of claim 9, wherein:

the wakeup message includes authentication information; and the authentication information includes the nonce encrypted according to the encryption algorithm.

17. A network interface controller (NIC) configured for use in a computer system, the NIC comprising:

one or more processors;

one or more transceivers; and a memory storing instructions that, when executed by the one or more processors, cause the NIC to:

send, by the one or more transceivers via a connection with a server, a registration message to the server, while the computer system is in a sleep mode, wherein the registration message includes information identifying the computer system, a nonce, and an encryption algorithm;

maintain the connection with the server for a period of time after sending the registration message, wherein the period of time is based on when the registration message is sent to the server;

receive by the one or more transceivers a wakeup message, from the server, to wake the computer system from the sleep mode;

authenticate the wakeup message using the nonce and the encryption algorithm sent to the server; and wake the computer system upon authenticating the wakeup message.

18. The NIC of claim 17, wherein the wakeup message is received from the server before expiration of the connection with the server.

19. The NIC of claim 17, wherein execution of the instructions further causes the NIC to:

periodically send by the one or more transceivers a new registration message to the server before expiration of the connection with the server; and maintain the connection with the server for an additional period of time after sending each respective new registration message, wherein the additional period of time is based on when the respective new registration message is sent to the server.

20. The NIC of claim 17, wherein:

the registration message includes user-selected human-readable identification information for the computer system; and the wakeup message includes the user-selected human-readable identification information for the computer system.

21. The NIC of claim 17, wherein:

the wakeup message includes a pre-shared key that is known to the computer system and to a second computer system; and the wakeup message originates from the second computer system.

22. The NIC of claim 17, wherein the network is a wide-area-network.

* * * * *